United States Patent
Shuck

(10) Patent No.: US 9,617,857 B2
(45) Date of Patent: Apr. 11, 2017

(54) GAS TURBINE ENGINE COMPONENT

(71) Applicant: Rolls-Royce Corporation, Indianapolis, IN (US)

(72) Inventor: Quinlan Y. Shuck, Indianapolis, IN (US)

(73) Assignee: Rolls-Royce Corporation, Indinanapolis, IN (US)

( * ) Notice: Subject to any disclaimer, the term of this patent is extended or adjusted under 35 U.S.C. 154(b) by 596 days.

(21) Appl. No.: 14/141,109

(22) Filed: Dec. 26, 2013

(65) Prior Publication Data
US 2014/0241883 A1   Aug. 28, 2014

Related U.S. Application Data

(60) Provisional application No. 61/768,439, filed on Feb. 23, 2013.

(51) Int. Cl.
*F01D 5/14* (2006.01)
*B23P 15/04* (2006.01)

(52) U.S. Cl.
CPC .............. *F01D 5/147* (2013.01); *B23P 15/04* (2013.01); *F05D 2300/6033* (2013.01); *Y02T 50/672* (2013.01); *Y02T 50/673* (2013.01); *Y10T 29/49321* (2015.01)

(58) Field of Classification Search
CPC .......... F01D 5/147; F01D 5/187; F01D 5/189; B23P 15/04; Y02T 50/672; Y02T 50/673; Y10T 29/49321; F05D 2300/6033; F05B 2230/10
See application file for complete search history.

(56) References Cited

U.S. PATENT DOCUMENTS 3,389,889 A * 6/1968 Penny ................ F01D 5/081
                                                    416/222
3,844,728 A   10/1974 Copley et al.
4,152,816 A    5/1979 Ewing et al.
4,247,259 A    1/1981 Saboe et al.
(Continued)

FOREIGN PATENT DOCUMENTS

EP   2487330 A2   8/2012
GB   2142387 A    1/1985
(Continued)

OTHER PUBLICATIONS

International Search Report and Written Opinion for International Application No. PCT/US2013/077842, Dec. 22, 2014, 11 pages.

*Primary Examiner* — Craig Kim
*Assistant Examiner* — Eldon Brockman
(74) *Attorney, Agent, or Firm* — Barnes & Thornburg LLP

(57) ABSTRACT

Embodiments are disclosed of a turbomachinery component having an outer part that is captured between a cap and a base of the component. In one form, the outer part is placed in compression between the cap and the base. The outer part can be formed prior to being placed between the cap and the base. In some forms, the outer part can be formed partially or completely while engaged with the component. A fugitive spacer can be placed between the outer part and an extension of the component. In various embodiments, the extension can reach into an opening of the outer part and the cap can be coupled with the extension.

18 Claims, 4 Drawing Sheets

(56) References Cited

U.S. PATENT DOCUMENTS

| | | | |
|---|---|---|---|
| 4,285,634 A * | 8/1981 | Rossman | F01D 5/284 416/241 B |
| 4,335,997 A | 6/1982 | Ewing et al. | |
| 4,396,349 A * | 8/1983 | Hueber | F01D 5/284 415/115 |
| 4,473,336 A | 9/1984 | Coney et al. | |
| 4,480,956 A * | 11/1984 | Kruger | F01D 5/14 415/173.4 |
| 4,519,745 A * | 5/1985 | Rosman | F01D 5/284 416/241 B |
| 4,563,125 A * | 1/1986 | Boudigues | F01D 5/18 415/115 |
| 4,563,128 A | 1/1986 | Rossmann et al. | |
| 4,595,340 A * | 6/1986 | Klassen | F01D 5/147 416/193 A |
| 4,629,397 A * | 12/1986 | Schweitzer | F01D 5/284 165/907 |
| 4,645,421 A | 2/1987 | Huether | |
| 4,790,721 A | 12/1988 | Morris et al. | |
| 4,802,824 A | 2/1989 | Gastebois et al. | |
| 5,382,453 A * | 1/1995 | Mason | C04B 35/806 264/81 |
| 5,626,462 A * | 5/1997 | Jackson | C22C 32/00 416/229 A |
| 5,640,767 A * | 6/1997 | Jackson | B23P 15/04 118/427 |
| 5,820,337 A * | 10/1998 | Jackson | C22C 32/00 415/200 |
| 6,321,449 B2 * | 11/2001 | Zhao | B23P 15/04 29/890.01 |
| 6,451,416 B1 * | 9/2002 | Holowczak | B32B 18/00 264/125 |
| 6,514,046 B1 * | 2/2003 | Morrison | F01D 5/187 416/229 A |
| 6,648,597 B1 * | 11/2003 | Widrig | F01D 9/044 415/200 |
| 6,696,144 B2 * | 2/2004 | Holowczak | B32B 18/00 428/293.4 |
| 6,921,014 B2 * | 7/2005 | Hasz | C23C 26/02 228/122.1 |
| 7,093,359 B2 * | 8/2006 | Morrison | F01D 5/282 264/257 |
| 7,500,833 B2 * | 3/2009 | Bublath | B23P 6/005 29/402.09 |
| 7,625,180 B1 * | 12/2009 | Liang | F01D 5/186 29/889.2 |
| 7,670,116 B1 | 3/2010 | Wilson, Jr. et al. | |
| 8,033,790 B2 * | 10/2011 | Vance | F01D 5/147 416/213 R |
| 8,162,617 B1 * | 4/2012 | Davies | F01D 5/147 416/223 R |
| 8,206,098 B2 * | 6/2012 | Prill | F01D 5/284 415/200 |
| 8,206,109 B2 * | 6/2012 | Morgan | F01D 5/147 416/97 R |
| 8,210,803 B2 * | 7/2012 | Schaff | F01D 5/147 415/200 |
| 8,453,327 B2 * | 6/2013 | Allen | B23P 15/04 228/125 |
| 8,475,132 B2 * | 7/2013 | Zhang | F01D 5/147 416/225 |
| 8,533,949 B2 * | 9/2013 | Bunker | F01D 5/147 29/889.7 |
| 8,938,879 B2 * | 1/2015 | Bunker | F01D 5/147 29/889.7 |
| 8,956,105 B2 * | 2/2015 | Uskert | F01D 5/10 415/115 |
| 2006/0120869 A1 | 6/2006 | Wilson et al. | |
| 2009/0003993 A1 * | 1/2009 | Prill | F01D 5/284 415/134 |
| 2010/0021290 A1 * | 1/2010 | Schaff | F01D 5/147 415/200 |
| 2010/0068034 A1 | 3/2010 | Schiavo et al. | |
| 2012/0207953 A1 * | 8/2012 | Bunker | F01D 5/147 428/34.1 |
| 2012/0237355 A1 * | 9/2012 | Zhang | F01D 5/147 416/226 |
| 2013/0316100 A1 * | 11/2013 | Bunker | F01D 5/147 428/34.1 |
| 2014/0199174 A1 * | 7/2014 | Roberts, III | F01D 5/147 416/232 |

FOREIGN PATENT DOCUMENTS

| | | |
|---|---|---|
| GB | 2440345 A | 1/2008 |
| WO | 2012001279 A1 | 1/2012 |

\* cited by examiner

GAS TURBINE ENGINE COMPONENT

CROSS REFERENCE TO RELATED APPLICATIONS

This application claims priority to and the benefit of U.S. Provisional Patent Application No. 61/768,439, filed 23 Feb. 2013, the disclosure of which is now expressly incorporated herein by reference.

TECHNICAL FIELD

The present disclosure generally relates to gas turbine engine components. More particularly, but not exclusively, the present disclosure relates to gas turbine engine flow path components such as, for example, turbine blades.

BACKGROUND

Providing gas turbine engine components capable of operation in a variety of conditions, such as relatively high stress and/or relatively high temperature environments, remains an area of interest. Some existing systems have various shortcomings relative to certain applications. Accordingly, there remains a need for further contributions in this area of technology.

SUMMARY

One embodiment of the present invention is a unique gas turbine engine flow path component. Other embodiments include apparatuses, systems, devices, hardware, methods, and combinations for gas turbine engine components. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
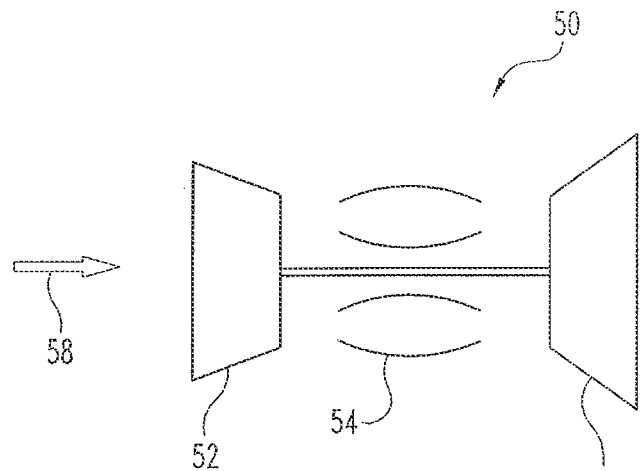
FIG. 1 shows one embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 50 is disclosed that includes a compressor 52, combustor 54, and turbine 56. During operation the gas turbine engine receives an incoming flow of working fluid 58 and compresses it with the compressor 52 before being mixed with a fuel and combusted in the combustor 54. The turbine 56 expands a flow stream from the combustor 54 to produce work. The gas turbine engine 50 can take a variety of forms other than that depicted in FIG. 1. For example, though the gas turbine engine 50 is depicted as a single spool engine, in other embodiments the gas turbine engine 50 can include any number of spools. The gas turbine engine 50 can take the form of a turbojet, turboshaft, turbofan, or turboprop engine and in some applications can be used as a power plant for an aircraft (not shown).

As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Figure 2:
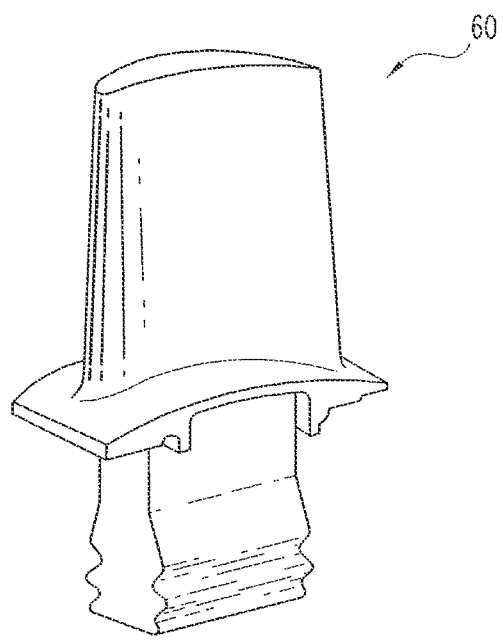
FIG. 2 shows an embodiment of a gas turbine engine component.

Turning now to FIG. 2, one embodiment of a gas turbine engine component 60 is shown. The component 60 can be used within a turbomachinery component of the gas turbine engine 50, such as the turbine 56 (shown in FIG. 1). In one form the component 60 has an airfoil shape that includes a relatively low pressure side and a relatively high pressure side when in use. In some embodiments, the component 60 can be used as a blade of the turbine 50 to extract work from a flow of fluid discharged from the combustor 54.

Figure 3:
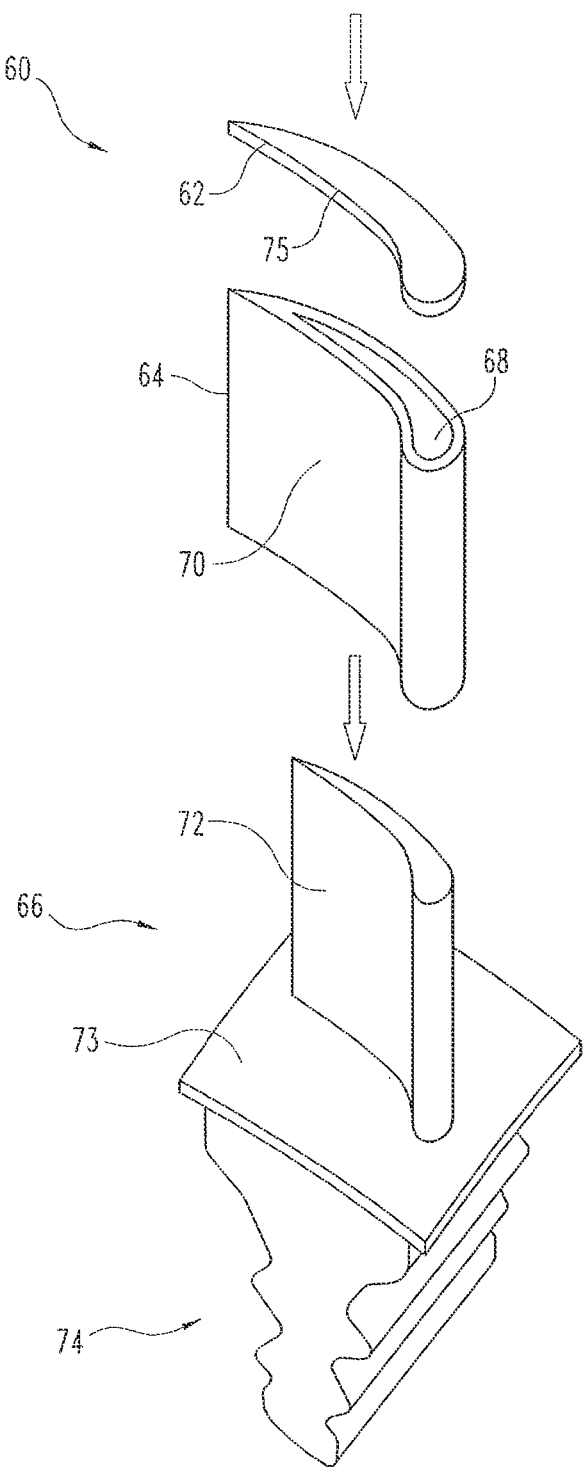
FIG. 3 illustrates another embodiment of a gas turbine engine component.

FIG. 3 depicts one embodiment of components that can be used to build the gas turbine engine component 60. The embodiment depicted illustrates various parts of the gas turbine engine component 60 and includes an end cap 62, blade outer part 64, and blade attachment 66. As will be described further below, the parts are assembled and fastened together in a manner that, in one embodiment, a compressive load is imparted to the blade outer part 64. The blade outer part 64 includes an opening 68 within which a portion of the blade attachment 66 can be received. In one non-limiting form, the blade outer part 64 is formed using a process before it is placed around the blade attachment 66. In another non-limiting form, the blade outer part 64 is formed as a whole and then slidingly received upon the blade attachment 66. The blade outer part 64 is depicted as one piece in the illustrated form but it will be appreciated that it can be formed of many pieces in other forms. In the illustrated embodiment, the blade outer part 64 includes an outer surface 70 over which a working fluid flows during operation of the gas turbine engine 50. The outer surface 70 is shown in the form of an airfoil shape, but in other embodiments it can take a variety of other shapes.

The blade outer part 64 can be formed through a variety of techniques and from a variety of materials. To set forth just a few non-limiting examples, the blade outer part 64 can be made from a ceramic material. The blade outer part 64 can be made using a variety of ceramic forming processes. In one form, the ceramic blade outer part 64 can be made via free form fabrication techniques such as, but not limited to, direct laser stereolithography. Such a process can include activating a monomer binder in which ceramic particles are suspended to form a partially developed ceramic blade outer part 64. The partially developed blade outer part 64 can sometimes be referred to as a green ceramic article and can be processed to remove the binder and sinter the ceramic particles to create a final usable form. In one form, the binder is removed by raising a temperature of the blade outer part 64 to pyrolyze the binder. Other techniques for removing the binder are contemplated herein.

In another form, the blade outer part 64 can be a ceramic matrix composite material that is formed prior to being engaged with the blade attachment 66. The ceramic matrix composite can be partially or completely formed prior to being engaged with the blade attachment 66. Numerous techniques are known for producing ceramic matrix composites, many of which rely upon multi-step processes. Such steps can include coating of fibers, infusion of matrix material, densification, and final firing, among potential other steps and different combinations. For purposes of the instant application, the ceramic matrix composite can either be fully developed into a final usable form prior to being coupled with the blade attachment 66, or it can be partially developed into a final form and rely upon additional steps after the blade outer part 64 is coupled with the blade attachment 66.

A partially developed blade outer part 64 can be placed around the blade attachment 66 and then processed to its final form using steps appropriate for the material type. When the blade outer part 64 includes a ceramic material such as the various embodiments described above, additional processing steps can be used depending on whatever is required to finalize the ceramic, whether it be firing to sinter the ceramic particle, densifying the article, or otherwise.

The blade attachment 66 includes an extension 72 from a portion 73 and that is received within the opening 68 of the blade outer part 66. The extension 72 can take the shape complementary to the opening 68 or a portion thereof, but other shapes can also be used. The extension 72 can be metallic or any other material. In the illustrated embodiment, the blade attachment 66 includes a coupling portion 74 opposite the extension 72 that can be used to attach the component 60 to a rotor (not shown). In the illustrated form, the coupling portion 74 is depicted as a fir tree, but other forms are contemplated herein. Depending on the application, the extension 72 and the coupling portion 74 can be integral with each other or can be components coupled together to form the blade attachment 66.

In the illustrated embodiment, the end cap 62 is used to capture the blade outer part 64 to the blade attachment 66. The end cap 62 includes a periphery 75 at least a portion or portions of which is larger than a dimension of the blade outer part 64 such that when the end cap 62 is fastened to the blade attachment 66 the blade outer part 64 is captured between the end cap 62 and the portion 73. The end cap 62 can include the same external shape as the blade outer part 64 or another shape, but it will be appreciated that in the illustrated embodiment the blade outer part 64 is captured when at least a part of the end cap 62 extends beyond the opening 68. The end cap 62 can be metal or any other suitable material. The end cap 62 can include a portion that engages the blade outer part 64 and a portion that engages the blade attachment 66. In one form the end cap 62 is relatively flat, but in some embodiments the end cap 62 can take on other shapes. For example, the end cap 62 can include one or more extensions that are configured to reach into the opening 68 and engage the extension 72. In these embodiments, the extension 72 may not fully reach near the end of the blade outer part 64 thus requiring that the end cap 62 include a portion that reaches toward the extension 72. In many embodiments, the extension 72 will be configured to reach substantially into the opening 68 such that any extensions protruding from the end cap 62 need not extend to the end of the blade outer part 64 configured close to the portion 73.

In some embodiments of a process for assembling the component 60, the blade outer part 64 can be placed in compression between the end cap 62 and the blade attachment 66. The end cap 62 of the illustrated embodiment is initially separate from the blade attachment 66 but is subsequently fastened to it during a process of assembly to place the blade outer part 64 in compression. The blade outer part 64 can include a dimension that, when the blade outer part 64 is placed into contact with the portion 73, extends beyond the extension 72. The end cap 62 can be used to compress the blade outer part 64 by a force applied to the end cap 62 with a tool or other useful device and bring the end cap 62 into proximity to the extension 72. The end cap 62 can be fastened such as through mechanical fastening, it can be bonded to the blade attachment 66, and it can be fastened via a process such as brazing and the like. In short, the end cap 62 can be fastened using a variety of approaches, not all of which are described herein for sake of brevity.

Figure 4:
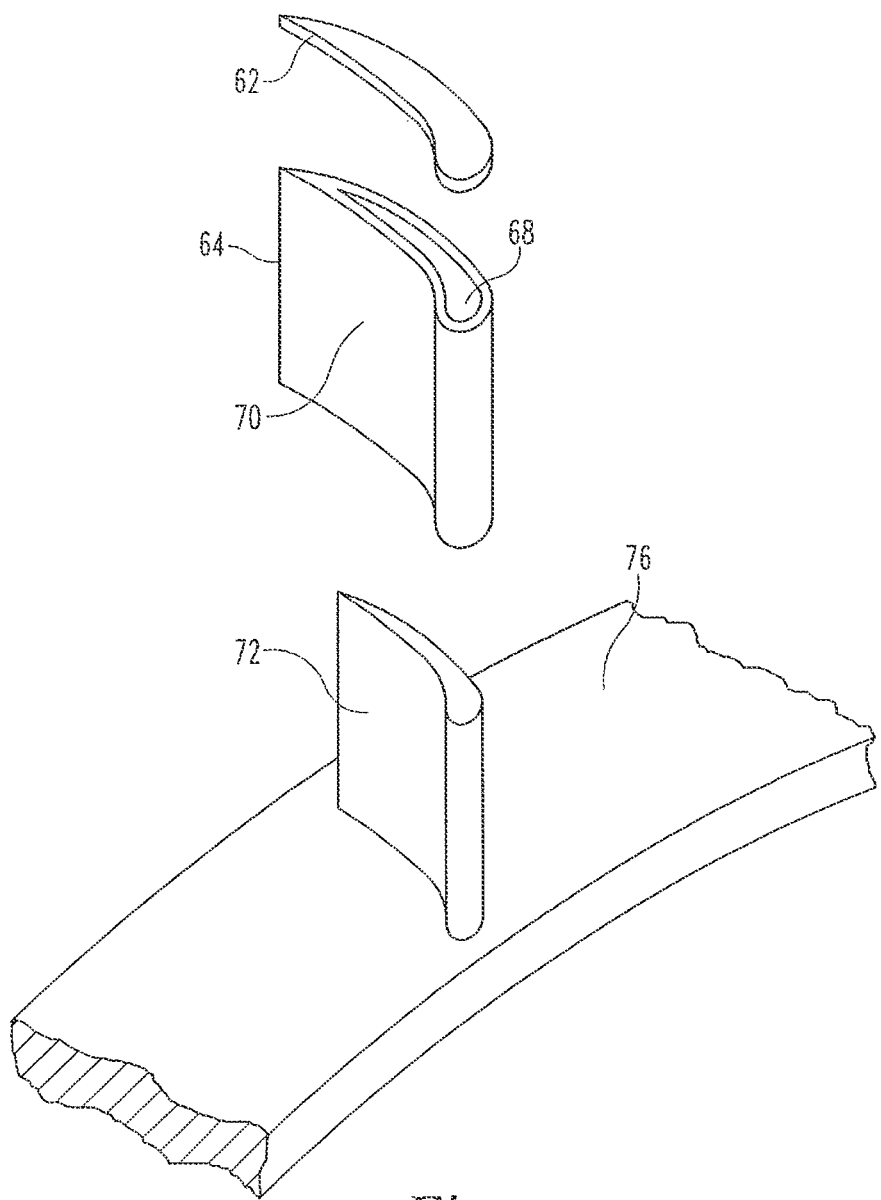
FIG. 4 depicts a further embodiment of a gas turbine engine component.

Turning now to FIG. 4, another embodiment is shown of a process to build the gas turbine engine component 60. In FIG. 4, the end cap 62 is used to secure the blade outer part 64 to a disk 76. The disk 76 includes the extension 72. Though not depicted, the disk 76 can include any number of extensions 72 capable of receiving blade outer parts 66.

Figure 5:
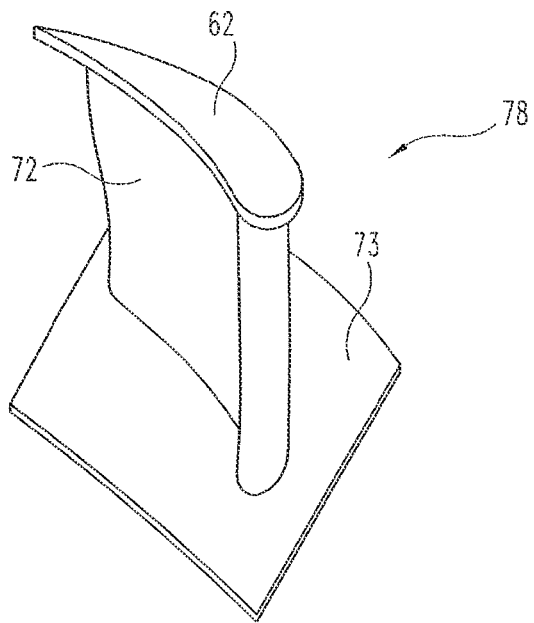
FIG. 5 depicts an embodiment of a gas turbine engine component.
Figure 5:
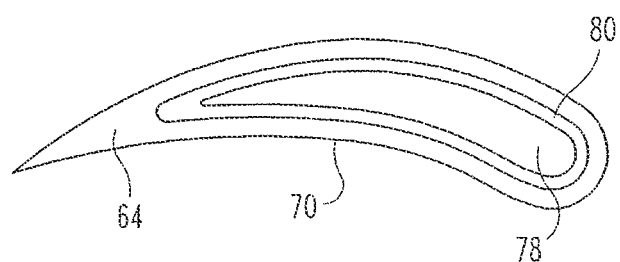

Another embodiment of the present application is depicted in FIG. 5. A blade mandrel 78 is depicted and is configured to receive a blade outer part 64 during a build process. The blade mandrel 78 can be used to receive a single blade outer part 64 or can be part of a larger device capable of receiving multiple blade outer parts 64, similar to the variations described above with respect to FIGS. 3 and 4. The blade outer surface 70 can extend along an axis and can be manufactured according to a desired aerodynamic contour, as is true of the embodiments described above. The inner part of the blade outer part 64 that is received around the mandrel 78 can have any shape desired and/or necessary. Correspondingly, the mandrel 78 can have any shape and generally extends from the base. The shapes of the mandrel 78 or the inner part of the blade outer part 64 need not conform to the shape of the blade outer surface 70.

In one form, the blade mandrel 78 includes the end cap 62, extension 72 and the portion 73. The blade mandrel 78 can be part of a blade attachment 66 or can be part of a disk 76 as shown above in various embodiments. In some forms, the end cap 62 can be affixed and/or integral with the mandrel 78 at the beginning of a build process of the blade outer part 64. Although the end cap 62 is depicted in FIG. 5 as coupled with the extension 72 prior to building the blade outer part 64, in some embodiments the end cap 62 can be affixed to the extension 72 after the blade outer part 64 is built or after it is partially built. For example, the end cap 62 can be affixed after the blade outer part 64 is processed into a final form or it can be affixed at some intermediate point during processing. In one non-limiting embodiment, the end cap 62 can be affixed after the blade outer part 64 has been completely built upon the mandrel 78. In another non-limiting example, the end cap 62 can be affixed when the blade outer part 64 is only partially completed, some examples of which were discussed above. To recall just a few non-limiting examples from the discussion above, the blade outer part 64 can be built upon the blade mandrel 78 as part of a stereolithography process and thereafter processed to harden the ceramic. In another non-limiting example, a blade outer part 64 may be made from ceramic matrix composite that can be partially or completely formed before being coupled with the blade mandrel 78. Other variations are contemplated herein.

The end cap 62 of the embodiment in FIG. 5 can be used in some applications to provide a compression to the blade outer part 64 as discussed above. To set forth just one non-limiting example, the end cap 62 can be affixed to the extension 72 after the blade outer part 64 is processed into its final form. The end cap 62 can be urged into a coupled relationship with the extension 72 to thereby compress the blade outer part 64. Any suitable mechanism, whether machine enabled or by hand, can be used to urge the end cap 62 into a position to compress the blade outer part 64.

In the illustrated embodiment a fugitive spacer or agent 80 is applied to the blade mandrel 78 such that during a processing of the blade outer part 64 the fugitive spacer 80 is removed. In one non-limiting example, the fugitive spacer 80 can be removed via pyrolysis. The fugitive spacer 80 can be applied to the blade mandrel 78 by coating or molding, or a combination of the two, among other possible variations. The fugitive spacer 80 can serve to provide a space for differences in thermal expansion as the blade outer part 64 is completed. For example, if the blade mandrel 78 were made of metal and the blade outer part 64 included a ceramic in its final form, such as a ceramic matrix composite, then the fugitive spacer 80 can be used to accommodate changes in size between the two as the ceramic matrix composite is processed into its final form. In some forms the blade outer part 64 may shrink during processing in which case the fugitive nature of the spacer 80 can accommodate the change in size. Any variety of materials can be used as the fugitive spacer 80. For example, an organic material or organic derivative that burns off at elevated temperatures can be used. Partially dense materials like a metal felt or lattice structure that provide compliance and damping can also be used. Alternatively and/or additionally, a combination of materials that does not completely burn off can be used.

One aspect of the present application provides an apparatus comprising a rotatable turbomachinery blade component having an inner core extending from a base and made from a first material, and an outer flow surface made from a second material and captured between the base and a cap that is fastened to the core. The core extending substantially into an interior of the outer flow surface. The outer flow surface placed in compression when the cap is affixed to the core.

A feature of the present application provides wherein the first material is different than the second material. Another feature of the present application provides wherein the first material is metallic and the second material includes a ceramic.

Yet another feature of the present application provides wherein the second material is a ceramic matrix composite. Still yet another feature of the present application provides wherein the rotatable turbomachinery blade component is a turbine blade component. A further feature of the present application provides wherein the turbine blade component is an integral rotor and blade.

Another aspect of the present application provides a method comprising a number of operations. The operations including enclosing a portion that extends from a base of a rotatable turbomachinery component with a component that forms a flow path surface for the rotatable turbomachinery component, the component disposed between a working fluid flow path and the portion, loading the flow path surface component in compression as part of a manufacturing process, and affixing a load bearing portion to the portion that extends from the base of the rotatable turbomachinery component. The flow path forming part is placed in compression between the load bearing portion and a base of the rotatable turbomachinery component.

A feature of the present application provides wherein the enclosing includes sliding a flow path surface component along a core of the rotatable turbomachinery component. Another feature of the present application provides wherein the turbomachinery component is a gas turbine engine blade and the enclosing includes enclosing the entirety of the blade.

Still another feature of the present application provides wherein the affixing includes one of brazing, welding, and fastening and which further includes extruding the flow path surface component. Yet still another feature of the present application provides wherein the flow path surface component includes a ceramic. A further feature of the present application provides wherein the flow path surface component includes a ceramic matrix composite.

Yet another aspect of the present application provides a method comprising a number of operations. The number of operations including forming a gas turbine engine airflow component having a component core including inserting an airflow surface member having an internal opening around a component core of the gas turbine engine airflow component, the component core extending substantially through the airflow surface member, and fastening an end cap to the component core wherein the airflow member is placed in compression by the end cap.

A feature of the present application provides wherein the airflow surface member includes a radially inner end and a radially outer end, wherein the fastening is located on a portion of the component core that extends past the radially inner end of the airflow surface member, and wherein the airflow surface member includes a ceramic and the gas turbine engine airflow component is metallic. Another feature of the present application provides wherein the airflow surface member is a blade surface airflow member, and wherein the gas turbine engine airflow component is a gas turbine engine blade component. Yet another feature of the present application provides wherein the inserting includes forming a surface of the airflow surface member, and which further includes processing the airflow surface member to form a finished airflow surface member, and engaging the gas turbine engine airflow component with a fugitive agent capable of being removed during a manufacturing process to form a space between the airflow surface member and the gas turbine engine airflow component.

Yet still another feature of the present application further includes extruding the flow path surface component, and wherein the fastening includes one of mechanically fastening and metal joining. A further feature of the present application provides wherein the end cap includes a turbine tip seal and which further includes firing the airflow surface member.

A still further aspect of the present application provides an apparatus comprising a rotatable turbomachinery blade component having an inner core extending from a base and made from a first material, an outer flow surface made from a second material and captured between the base and a cap that is fastened to the core, the core extending substantially into an interior of the outer flow surface, and a fugitive spacer placed between the inner core and the outer flow surface. The fugitive space structured to be removed at elevated temperatures.

A feature of the present application provides wherein the first material is different than the second material. Another feature of the present application provides wherein the first material is metallic and the second material includes a ceramic.

Still another feature of the present application provides wherein the second material is a ceramic matrix composite. Yet still another feature of the present application provides wherein the rotatable turbomachinery blade component is a turbine blade component, and wherein the fugitive space is structured to be removed through pyrolysis. Still yet another feature of the present application provides wherein the turbine blade component is an integral rotor and blade.

A yet still further aspect of the present application provides a method comprising a number of operations. The number of operations including forming a gas turbine engine airflow component having a component core including: inserting an airflow surface member having an internal opening around a component core of the gas turbine engine airflow component, the component core extending substantially through the airflow surface member, fastening an end cap to the component core, and engaging the gas turbine engine airflow component with a fugitive agent capable of being removed during a manufacturing process to form a space between the airflow surface member and the gas turbine engine airflow component.

A feature of the present application provides wherein the airflow surface member includes a radially inner end and a radially outer end, wherein the fastening is located on a portion of the component core that extends past the radially inner end of the airflow surface member, and wherein the airflow surface member includes a ceramic and the gas turbine engine airflow component is metallic. Another feature of the present application provides wherein the airflow surface member is a blade surface airflow member, wherein the gas turbine engine airflow component is a gas turbine engine blade component.

Still another feature of the present application provides wherein the inserting includes forming a surface of the airflow surface member, and which further includes: processing the airflow surface member to form a finished airflow surface member, and wherein the fastening includes fastening the end cap to the component core wherein the airflow member is placed in compression by the end cap. Yet still another feature of the present application further includes extruding the flow path surface component, and wherein the fastening includes one of mechanically fastening and metal joining.

Still yet another feature of the present application provides wherein the end cap includes a turbine tip seal and which further includes firing the airflow surface member. Yet still another aspect of the present application provides an apparatus comprising a rotatable gas turbine engine component having an inner core, a fugitive spacer spaced apart from the inner core, and a green article forming a flow path surface, the fugitive spacer disposed between the inner core and the green article.

A feature of the present application provides wherein the fugitive spacer is composed of a material capable of being pyrolyzed at elevated temperatures. Another feature of the present application provides wherein the green article includes a ceramic. Yet another feature of the present application provides wherein the green article is a ceramic matrix composite.

A further aspect of the present application provides a method comprising a number of operations. The number of operations including building a gas turbine engine airflow component having an outer flow surface and an inner core, the building including placing a fugitive spacer adjacent the inner core, forming the outer flow surface around the inner core, wherein the fugitive spacer is between the inner core and the outer flow surface, and heating the gas turbine engine airflow component to remove the fugitive spacer.

A feature of the present application provides wherein the placing includes coating the inner core with the fugitive spacer. Another feature of the present application provides wherein the gas turbine engine airflow component is a blade of a turbomachinery component, and wherein the outer flow surface includes a ceramic.

Yet another feature of the present application provides wherein the forming includes free form fabricating the outer flow surface. Still another feature of the present application provides wherein the heating includes decomposing the fugitive spacer through pyrolysis and shrinking the gas turbine engine airflow component. Yet still another feature of the present application provides wherein the heating includes thermally processing the outer flow surface, wherein the outer flow surface includes a ceramic.

A still further aspect of the present application provides a method comprising a number of operations. The number of operations including covering a rotatable turbomachinery component with a fugitive material, forming a green ceramic article upon the fugitive material to produce an airfoil shaped surface, and thermally processing the rotatable turbomachinery component to remove the fugitive binder and cure the green ceramic article.

A feature of the present application provides wherein the rotatable turbomachinery component is metallic and the green ceramic article forms a ceramic matrix composite when thermally processed. Another feature of the present application provides wherein the rotatable turbomachinery component is a rotor having a plurality of cores upon which the fugitive material covers.

Still another feature of the present application provides wherein the green ceramic article extends between a radially inner end and a radially outer end, and which further includes loading the radially inner end toward the radially outer end by affixing an end portion to a core of the rotatable turbomachinery component. Yet still another feature of the present application provides wherein the thermally processing includes removing a binder of the green ceramic article, the green ceramic article shrinking as a result. A further feature of the present application provides wherein the rotatable turbomachinery component is a turbine blade.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a rotatable turbomachinery blade component having an inner core extending from a base and made from a first material;
   an outer flow surface made from a second material and captured between the base and a cap that is fastened to the core, the core extending substantially into an interior of the outer flow surface; and
   a fugitive spacer placed between the inner core and the outer flow surface, the fugitive spacer structured to be removed by heating,
   wherein the first material is metallic and the second material includes is a ceramic matrix composite.

2. The apparatus of claim 1, wherein the first material is different than the second material.

3. The apparatus of claim 1, wherein the rotatable turbomachinery blade component is a turbine blade component, and wherein the fugitive spacer is structured to be removed through pyrolysis.

4. The apparatus of claim 3, wherein the turbine blade component is an integral rotor and blade.

5. The apparatus of claim 1 wherein the outer flow surface comprises a green article forming a flow path surface, the fugitive spacer disposed between the inner core and the green article.

6. The apparatus of claim 5, wherein the fugitive spacer is composed of a material capable of being pyrolyzed.

7. The apparatus of claim 5, wherein the green article includes a ceramic.

8. The apparatus of claim 7, wherein the green article is a ceramic matrix composite.

9. A method comprising:
   forming a gas turbine engine airflow component having a component core including:
   arranging an airflow surface member having an internal opening around a component core of the gas turbine engine airflow component, the component core extending substantially through the airflow surface member;
   fastening an end cap to the component core; and
   engaging the gas turbine engine airflow component with a fugitive agent capable of being removed during a manufacturing process to form a space between the airflow surface member and the component core.

10. The method of claim 9, wherein the airflow surface member includes a radially inner end and a radially outer end, wherein the fastening is located on a portion of the component core that extends past the radially inner end of the airflow surface member, and wherein the airflow surface member includes a ceramic and the gas turbine engine airflow component is metallic.

11. The method of claim 9, wherein the airflow surface member is a blade surface airflow member, wherein the gas turbine engine airflow component is a gas turbine engine blade component; and
   wherein the inserting includes forming a surface of the airflow surface member, and which further includes:
   processing the airflow surface member to form a finished airflow surface member; and
   wherein the fastening includes fastening the end cap to the component core wherein the airflow member is placed in compression by the end cap.

12. The method of claim 9, which further includes extruding the flow path surface component, and wherein the fastening includes one of mechanically fastening and metal joining.

13. The method of claim 9, wherein the end cap includes a turbine tip seal and which further includes firing the airflow surface member.

14. A method comprising:
   building a gas turbine engine airflow component having an outer flow surface and an inner core formed of a metallic, the building including:
   placing a fugitive spacer adjacent the inner core;
   forming the outer flow surface of ceramic matrix composite around the inner core, wherein the fugitive spacer is between the inner core and the outer flow surface; and
   heating the gas turbine engine airflow component to remove the fugitive spacer.

15. The method of claim 14, wherein the placing includes coating the inner core with the fugitive spacer.

16. The method of claim 14, wherein the gas turbine engine airflow component is a blade of a turbomachinery component, and wherein the outer flow surface includes a ceramic.

17. The method of claim 14, wherein the forming includes free form fabricating the outer flow surface, and wherein the heating includes decomposing the fugitive spacer through pyrolysis and shrinking the gas turbine engine airflow component.

18. The method of claim 14, wherein the heating includes thermally processing the outer flow surface, wherein the outer flow surface includes a ceramic.

* * * * *